United States Patent [19]

Schreyer et al.

[11] 4,065,510

[45] Dec. 27, 1977

[54] PRODUCTION OF AN ALKENOL FROM AN ALKENE OXIDE

[75] Inventors: Gerd Schreyer; Herbert Tanner, both of Grossauheim; Wolfgang Weigert, Offenbach; Ullrich Gora, Grossauheim, all of Germany

[73] Assignee: Deutsche Gold- und Silber-Scheideanstalt Vormals Roessler, Frankfurt, Germany

[21] Appl. No.: 640,210

[22] Filed: Dec. 12, 1975

Related U.S. Application Data

[62] Division of Ser. No. 193,691, Oct. 29, 1971, abandoned.

[30] Foreign Application Priority Data

Nov. 3, 1970  Germany .............................. 2053915

[51] Int. Cl.$^2$ .............................................. C07C 29/00
[52] U.S. Cl. .................................. 260/632 B; 252/437
[58] Field of Search .................................... 260/632 B

[56] References Cited

U.S. PATENT DOCUMENTS

| | | | |
|---|---|---|---|
| 2,860,598 | 11/1958 | Loesche | 117/100 B |
| 2,986,585 | 5/1961 | Denton | 260/632 B |
| 3,090,815 | 5/1963 | Denton | 260/632 B |
| 3,188,350 | 6/1965 | Martin et al. | 252/437 |
| 3,255,258 | 6/1966 | Charles et al. | 260/632 B |
| 3,285,967 | 11/1966 | Schaeffer | 252/437 |

OTHER PUBLICATIONS

Friedrichsen, "Chem. Ing. Tech.", 41st year (1969), pp. 967-970, partial translation provided.

*Primary Examiner*—Joseph E. Evans
*Attorney, Agent, or Firm*—Cushman, Darby & Cushman

[57] ABSTRACT

Lithium phosphate catalysts for the rearrangement of alkene oxides to the corresponding alkenols are prepared as overcoats on inert carriers. The catalysts are prepared for example by overcoating the inert carrier with the lithium phosphate in the presence of moisture.

3 Claims, No Drawings

PRODUCTION OF AN ALKENOL FROM AN ALKENE OXIDE

This is a division of application Ser. No. 193,691, filed Oct. 29, 1971 and now abandoned.

The present invention is concerned with a lithium phosphate suitable for the production of alkenols from the corresponding alkene oxides, especially for the production of allyl alcohol from propylene oxide.

It is known to rearrange alkene oxides to alkenols at elevated temperatures in the presence of lithium phosphate as a catalyst. Among other byproducts in this transformation are high molecular weight materials which are additionally inclined to form residues on the catalyst and to impair its effectiveness. It is therefore advantageous to keep the catalyst in constant contact with a washing liquid during the rearrangement in order to take up these byproducts. As liquids of this type substituted benzenes, as for example dodecyl benzene are especially suited as is shown in German Offenlegungsschrift 1801210 and the corresponding Schreyer et al U.S. application Ser. No. 856,169 filed Sept. 8, 1969 and now abandoned. The entire disclosures of Offenlegungsschrift 1801210 and the Schreyer et al application are hereby incorporated by reference.

The lithium phosphate is generally obtained by precipitation of lithium salt solutions with alkali phosphates and alkali hydroxides. For the production of suitable catalysts there are used special proportions and conditions for the precipitation and the further treatment of the precipitated lithium phosphate. In a given case inert fillers such as kieselguhr or activated carbon are added. The catalyst mass is employed in granular form or in the form of tablets. (German Pat. No. 1,099,524), German Auslegeschrift 1,251,308 and German Auslegeschrift 1,271,082).

The disadvantage in the use of the catalyst mass in granular form is that the granules and the filling, even with use of a narrow granular fraction, are erratic. Non uniform pressure and temperature distribution in the reaction space and a non uniform result in the reaction and in a given case in places an increased formation of undesired byproducts are the result. By the use of a catalyst molded in the form of tablets these disadvantages are avoided. However, the activity of the catalyst mass is reduced by the molding.

There has now been found a lithium phosphate catalyst for the rearrangement of alkene oxides to the corresponding alkenols which is characterized in that the lithium phosphate is present as a coating on an inert carrier. This kind of catalyst combines the advantages of a granular catalyst mass in regard to activity and of a catalyst mass molded to tablets in regard to uniformity of shape and the uniform running of the rearrangements, and besides requires a very much smaller amount of proportionally valuable lithium phosphate than conventional catalysts for equal catalytic activity since the lithium phosphate is present only in the actual active surface. The saving in lithium phosphate can amount to up to 90%, and is usually 60 to 70% for equivalent yield of alkenol.

Although the lithium phosphate to be added is a very finely divided, soft powder and is introduced on the carrier in the presence of moisture, it results in a solid coating and even without the use of binders as are customarily necessary in the production of coatings, or the use of high temperatures, as are provided for in the preparation of a corresponding $V_2O_5$ catalyst (Chem. Ing. Techn. 41 (1969), 967-969). The cohesiveness of the coating also is not lost in very long times of operation. They are in no way impaired by the use of washing liquids as are used to keep the catalyst pure in the aforementioned German Offenlegungsschrift 1,801,210 or Scheyer et al U.S. application Ser. No. 856,169. The catalyst produced according to the invention is preeminently suited for use in this process.

The lithium phosphate necessary for the production of the catalyst is precipitated in aqueous alkaline medium in known manner, from lithium hydroxide or from lithium salts such as the chloride and nitrate by reaction with phosphoric acid or phosphates, especially sodium or potassium phosphate. After thorough washing the lithium phosphate is used either in the wet condition or, after drying and grinding, as a fine powder.

As carriers there can be employed inert materials, preferably molded bodies of uniform size, especially of spherical shape, with smooth or preferably rough or corrugated surfaces. They generally measure between 1 and 20 mm. As carriers there are employed especially oxides or silicates, for example porcelain, quartz, alpha aluminum oxide or silicon carbide.

The lithium phosphate is placed on the carrier in the presence of moisture. If lithium phosphate is used which does not have the required moisture, the lithium phosphate and/or the carrier is moistened. For moistening there can be used water or organic solvents miscible with water which in a given case contain water, e.g. 10 to 90% water by weight. Primarily there are used solvents which have a boiling point below 120° C., for example lower alkanols such as methyl alcohol, ethyl alcohol, propyl alcohol and isopropyl alcohol or other water miscible solvents for example acetone.

The amount of water or solvent is adjusted according to the type and manner in which the lithium phosphate is brought onto the carrier and according to the surface condition of the carrier. Generally there are employed 0.5 to 4.0 parts by weight of water or organic solvent for each part by weight of lithium phosphate. There can be added to the lithium phosphate and/or to the water or the organic solvent the usual binders. It is not necessary, however, to add such binders.

For the formation of the lithium phosphate overcoat there are used procedures and equipments which are similar to those usable for coating pills and granules. For example the carrier is dusted with lithium phosphate under moisture or is milled with dry lithium phosphate under moisture and/or in moist lithium phosphate whereby there is used room temperatures of about 10° to 40° C. The necessary drying of the overcoat can also take place at room temperature, according to the type of liquid used for the moistening. However, it is also suitable to use elevated temperatures, especially up to 130° C. The coating can also be produced by spraying the carrier with a suspension of lithium phosphate in the named liquid with simultaneous vaporization of the liquid, in a given case at elevated temperature and as the case may be or reduced pressure.

The thickness of the layer of the lithium phosphate coating is adjusted in a fixed range according to the process conditions in the alkene oxide rearrangement. In general they amount to 0.1 to 2.0 mm. In the case where the coating is produced in a layer thickness of over 0.5 mm, it is advantageous to first produce a coating of lesser thickness, in a given case bring this to dryness and then in similar manner to gradually build up additional layers.

A preferred method for producing the catalyst of the invention is to precipitate the lithium phosphate from an aqueous solution of lithium hydroxide by addition of an aqueous solution of excess sodium ortho phosphate, filter it off and wash it with water until the filtrate has a pH of 10.5, subsequently dry the lithium phosphate at 70° to 130° C. and grind it to a particle size of below 0.1 mm. As carriers there are used balls with corrugated surfaces from alpha aluminum oxide with a uniform diameter between 1 and 10 mm. For building the lithium phosphate overcoat on the balls these are so long milled in the lithium phosphate with use of customary pill coating or granulating apparatus with the spraying on of water that a coating of about 0.1 to 1.0 mm is formed. The amount of water is so measured that in the overcoat for each part by weight of lithium phosphate there is present about 1 to 2 parts by weight of water. The balls are finally dried in air at room temperature or somewhat elevated temperature.

The lithium phosphate can be diluted by fillers such as activated carbon, kieselguhr, asbestos or talc in finely divided form. These fillers can be mixed with the precipitated moist lithium phosphate or with the dried lithium phosphate before or after the grinding. There can be employed up to 50 weight percent of filler additives, generally from 10 to 30 weight percent, based on the lithium phosphate.

The catalysts are especially used for the rearrangement of propylene oxide to allyl alcohol.

Unless otherwise indicated all parts and percentages are by weight.

EXAMPLE

A solution of 5.04 kg. of lithium hydroxide monohydrate in 20 liters of water were reacted with a solution of 22.8 kg. of sodium ortho phosphate dodecahydrate in 36 liters of water. The precipitate of lithium phosphate was filtered off. It was carefully washed with water, the pH value of the filtrate thereby returning to about 10.5. Portions of the moist lithium phosphate recovered were treated in the following ways for the comparative preparation of different catalysts.

a. granular catalyst

The lithium phosphate was dried at 120° C. and then comminuted. A granular fraction between about 5 and 6 mm. were sieved off and employed as catalyst. A liter (bulk volume) of catalyst contained 560 grams of lithium phosphate.

b. shaped catalyst

The lithium phosphate in the wet condition was forced through perforated plates having perforations of 5 mm. diameter. The molded bodies formed were dried at 120° C. and then employed as catalyst. A liter (bulk volume) of catalyst contained 630 grams of lithium phosphate.

c. molded catalyst

The lithium phosphate was molded with an extruder to strands of 5 mm. diameter. The strands were subsequently cut.
The cut pieces were dried at 120° C. and then added as catalyst. A liter (bulk volume) of catalyst contained 675 grams of lithium phosphate.

d. catalyst on carrier

The lithium phosphate was dried at 120° C. and ground to a fine powder with a two cage disintegrator. In a granulating apparatus made of polyethylene there were milled 400 grams of balls of alpha aluminum oxide having corrugated surfaces and diameters of 3 to 4 mm. in 50 grams of the lithium phosphate powder. After the lithium phosphate was taken up on the balls the balls were sprayed with about 200 grams of water. Subsequently the balls were milled in 20 grams of lithium phosphate powder and were sprayed with about 100 grams of water. The thus lithium phosphate overcoated balls were dried at 70° C. and then added as catalyst. A liter (bulk volume) of the catalyst contained 195 grams of lithium phosphate.

The catalysts prepared according to (a) to (d) were employed to prepare allyl alcohol from propylene oxide according to the process of German Offenlegungsschrift 1,801,210 and Schreyer et al U.S. application Ser. No. 856,169.

The results were:

| | catalyst a granular | b shaped | c molded | d on carrier |
|---|---|---|---|---|
| Feed | 400 | 400 | 400 | 400 |
| Conversion | 37.4 | 35.2 | 32.1 | 36.3 |
| Selectivity | 94.1 | 94.8 | 95.7 | 96.1 |
| Yield | 249 | 215 | 182 | 715 |
| Feed | 1250 | 1250 | 1250 | 1250 |
| Conversion | 62.4 | 58.1 | 51.8 | 61.8 |
| Selectivity | 90.6 | 91.8 | 91.2 | 91.4 |
| Yield | 1275 | 1134 | 869 | 3620 |

Explanation of Terms $$\text{Feed} = \frac{\text{amount of added propylene oxide/time}}{\text{bulk volume of catalyst}} \quad (\frac{g}{l \times h})$$

$$\text{Conversion} = \frac{\text{amount of converted propylene oxide}}{\text{amount of added propylene oxide}} \quad (\%)$$

$$\text{Selectivity} = \frac{\text{amount of allyl alcohol produced}}{\text{amount of reacted propylene oxide}} \quad (\%)$$

$$\text{Yield} = \frac{\text{amount of allyl alcohol produced/time}}{\text{amount of lithium phosphate}} \quad (\frac{g}{kg \times h})$$

In the example there were employed the general conditions of Schreyer et al application Ser. No. 856,169 Example 1, specifically a wash liquid or dodecyl benzene, a temperature of 280° C. and flow of wash liquid at about 5000 ml. per hour.

As the wash liquid there can be employed any of the other inert wash liquids mentioned in the Scheyer et al application. Thus there can be used for example hydrocarbons, halohydrocarbons, ethers, esters, ketones as well as certain heterocyclic compounds. Especially advantageous substances, for example, are technical alkyl benzene mixtures the type of dodecylbenzene ($C_{11}$ – $C_{14}$ alkylbenzene cut) or hexadecylbenzene ($C_{15}$ – $C_{18}$ alkylbenzene cut), aryl benzenes of the type of diphenyl or terphenyl, pure aliphatic hydrocarbons of the series of higher alkanes or alkenes can be used, likewise terpene derivatives, such as triterpenes and also hydrocarbon mixtures which are designated Vaseline (petroleum jelly) or heavy oil, halohydrocarbons, particularly the fluorohydrocarbons are most useful, advantageously there are also used ethers, especially substances of the type of aryl ethers, especially diphenyl ether, or mixed ethers of the type of 2-methoxynaphthalene. In the esters, there are preferably employed stabile fats or compounds from the group of sterically hindered esters, for example, pivalic acid esters. In the group of ketones, there can be named benzophenone and in the group of heterocyclic compounds quinoline.

Specific examples of washing liquids in addition to those mentioned above are o-diphenyl benzene, m-diphenylbenzene, p-diphenylbenzene, 1,3,5-triphenylbenzene, squalane, squalene, fish oil, bis(p-phenyl) phenyl ether, m-bis-(m-phenoxyl)-phenoxybenzene, heavy alkylbenzenes which contain mono and dialkyl groups and have an aliphatic chain of 12 to 20 carbon atoms, triacontane, n-decane, undecane, hexadecane, octadecane, eicosane, triacotene-1, hexadecene-1, menthane, alpha-terpinene, decahydronaphthalene, 1,4-diethylbenzene, 1,2,4,5-tetramethylbenzene, hexamethylbenzene, p-cymene, bibenzyl, naphthalene, 1-methylnaphthalene, 2-methylnaphthalene, fluorene, acenaphthene, coconut oil esters, soybean oil esters, corn oil esters, hydrogenated cotton seed oil esters, hydrogenated soybean oil esters, palm oil esters, triglyceryl stearate, triglyceryl palmitate, octyl pivalate, hexadecyl acetate, hexadecyl propionate, decyl butyrate, octyl valerate, heptyl caproate, amyl octanoate, heptyl decanoate, butyl laurate, butyl stearate, methyl eicosanate, methyl oleate, diethyl adipate, diethyl sebacate, phenyl benzoate, dioctyl phthalate, di(2-ethylhexyl) phthalate, di benzyl ether, 1,2-dimethoxybenzene, 2-ethoxynaphthalene, 2-methyl quinoline, 3-methyl quinoline, 4-methyl quinoline, 5-methyl quinoline, 6-methyl quinoline, 4-ethyl quinoline, 4,8-dimethyl quinoline, 2,3,8-trimethyl quinoline, 1-fluoronaphthalene and 4,4'-difluorobiphenyl.

The conversion of propylene oxide to allyl alcohol usually is carried out continuously at a temperature between 180° and 420° C., preferably between 240° and 330° C. The reaction can be at atmospheric pressure or superatmospheric pressure, e.g. 1 to 75 atmospheres.

In place of propylene oxide there can be used other 1,2 alkene oxides such as 1,2 butylene oxide and 1,2-amylene oxide to produce the corresponding alkenols.

What is claimed is:

1. In a process for the production of an alkenol from an alkene oxide at elevated temperature in the presence of a lithium phosphate catalyst the improvement comprising employing as the catalyst a lithium phosphate catalyst prepared by the process consisting essentially of coating molded, uniform, spherical particles of an inert carrier with particles of lithium phosphate in the presence of about 0.5 to 4 parts of moisture per part of lithium phosphate at a temperature from 10° to 130° C to produce a catalyst consisting essentially of molded, uniform, spherical particles of an inert carrier having an outer cohesive coating of the lithium phosphate.

2. A process according to claim 1 wherein the alkene oxide is propylene oxide and the alkenol is allyl alcohol.

3. In a process for the production of allyl alcohol from propylene oxide at elevated temperature in the presence of a lithium phosphate catalyst the improvement comprising employing as the catalyst a lithium phosphate catalyst prepared by the process consisting essentially of coating particles of an inert carrier with particles of lithium phosphate in the presence of about 0.5 to 4 parts of moisture per part of lithium phosphate at a temperature from 10° to 130° C to produce a catalyst consisting essentially of particles of an inert carrier having an outer cohesive coating of the lithium phosphate, said catalyst being employed as a fixed bed and said catalyst being kept in constant contact with an inert ester washing and regenerating liquid during the rearrangement of the propylene oxide to remove the high molecular weight substances formed from the catalyst.

* * * * *